United States Patent
Tsumori et al.

(10) Patent No.: US 8,813,798 B2
(45) Date of Patent: Aug. 26, 2014

(54) RUBBER COMPOSITION FOR TIRE, AND PNEUMATIC TIRE

(71) Applicant: Sumitomo Rubber Industries, Ltd., Kobe (JP)

(72) Inventors: Isamu Tsumori, Kobe (JP); Naoya Ichikawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 14/209,751

(22) Filed: Mar. 13, 2014

(65) Prior Publication Data

US 2014/0194578 A1  Jul. 10, 2014

Related U.S. Application Data

(62) Division of application No. 13/658,989, filed on Oct. 24, 2012.

(30) Foreign Application Priority Data

Oct. 25, 2011  (JP) .................... 2011-234112

(51) Int. Cl.
 *B60C 1/00*  (2006.01)
(52) U.S. Cl.
 USPC ........................................ 152/152; 524/572
(58) Field of Classification Search
 USPC ........................................ 524/572; 152/152
 See application file for complete search history.

(56) References Cited

U.S. PATENT DOCUMENTS

| 5,000,092 | A  | * | 3/1991 | Best ............................ 101/491 |
| 8,163,821 | B2 |   | 4/2012 | Hiro |
| 8,273,804 | B2 |   | 9/2012 | Nishimura |
| 2011/0166254 | A1 |   | 7/2011 | Nishimura |
| 2011/0230613 | A1 |   | 9/2011 | Hiro |

FOREIGN PATENT DOCUMENTS

| JP | 2001-114939 A | 4/2001 |
| JP | 2011-195638 A | 10/2011 |
| JP | 2011-195639 A | 10/2011 |
| JP | 2011-195640 A | 10/2011 |
| JP | 2011-195641 A | 10/2011 |
| JP | 2011-195642 A | 10/2011 |

* cited by examiner

*Primary Examiner* — Vickey Nerangis
(74) *Attorney, Agent, or Firm* — Birch, Stewart, Kolasch & Birch, LLP

(57) ABSTRACT

A rubber composition for a tire, and a pneumatic tire are provided in which the fuel economy, abrasion resistance, and deterioration resistance can be improved in a good balance. The present invention relates to a rubber composition for a tire, containing a rubber component that contains: a modified natural rubber having a phosphorus content of not more than 200 ppm; and butadiene rubber, wherein 60 to 95% by mass of the modified natural rubber and 5 to 40% by mass of the butadiene rubber are contained based on 100% by mass of the rubber component.

1 Claim, No Drawings

RUBBER COMPOSITION FOR TIRE, AND PNEUMATIC TIRE

CROSS REFERENCE

The present application is a 37 C.F.R. §1.53 (b) divisional of, and claims priority to, U.S. application Ser. No. 13/658,989, filed Oct. 24, 2012. Priority is also claimed to Japanese Application No. 2011-234112 filed on Oct. 25, 2011. The entire contents of each of these applications is hereby incorporated by reference.

TECHNICAL FIELD

The present invention relates to a rubber composition for a tire and also relates to a pneumatic tire formed from the rubber composition.

BACKGROUND ART

Recently, higher fuel economy of cars has been strongly demanded because of soaring fuel cost and introduction of environmental regulations. Therefore, higher fuel economy has been demanded of rubber compositions used for producing treads which account for a large portion of a tire among tire components.

One of known methods for improving the fuel economy is a method including reducing the amount of filler such as carbon black. Unfortunately, the reduction in the amount of filler tends to reduce the rubber strength, leading to poor abrasion resistance. For this reason, there are difficulties in achieving high levels of fuel economy and of abrasion resistance at the same time. Meanwhile, in addition to the fuel economy and abrasion resistance, the deterioration resistance is demanded of the rubber composition. Accordingly, a method has been desired in which the fuel economy and abrasion resistance are satisfied at the same time while good deterioration resistance is maintained.

Patent Literature 1 proposes the use of a modified butadiene rubber and the like in order to reduce the rolling resistance. Unfortunately, this proposal still leaves something to be desired from the viewpoint of satisfying the fuel economy and abrasion resistance at the same time while maintaining good deterioration resistance.

CITATION LIST

Patent Literature

Patent Literature 1: JP 2001-114939 A

SUMMARY OF INVENTION

Technical Problem

An object of the present invention is to solve the above problems, and provide a rubber composition for a tire, and a pneumatic tire, in which the fuel economy, abrasion resistance, and deterioration resistance can be improved in a good balance.

Solution to Problem

The present invention relates to a rubber composition for a tire, containing a rubber component that contains: a modified natural rubber having a phosphorus content of not more than 200 ppm; and butadiene rubber, wherein 60 to 95% by mass of the modified natural rubber and 5 to 40% by mass of the butadiene rubber are contained based on 100% by mass of the rubber component.

Preferably, the modified natural rubber has a nitrogen content of not more than 0.3% by mass and a gel content measured as a toluene insoluble content of not more than 20% by mass.

Preferably, the modified natural rubber is obtained by saponifying natural rubber latex. Preferably, the modified natural rubber is obtained by performing: a step (A) of saponifying natural rubber latex to prepare a saponified natural rubber latex; a step (B) of coagulating the saponified natural rubber latex and performing an alkali treatment on the resulting coagulated rubber; and a step (C) of washing the resulting rubber until the phosphorus content in rubber falls to not more than 200 ppm.

Preferably, the butadiene rubber is a modified butadiene rubber.

Preferably, the modified butadiene rubber has been modified with a compound represented by formula (I):

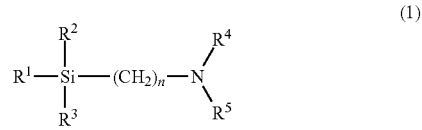

wherein $R^1$, $R^2$, and $R^3$ are the same as or different from each other, and each represent an alkyl group, an alkoxy group, a silyloxy group, an acetal group, a carboxyl group, a mercapto group, or a derivative thereof; $R^4$ and $R^5$ are the same as or different from each other, and each represent a hydrogen atom, an alkyl group, or a cyclic ether group; and n represents an integer.

Preferably, the rubber composition further contains carbon black.

Preferably, the rubber composition is used for a tread for heavy load tires.

The present invention also relates to a heavy load tire including a tread formed from the rubber composition.

Advantageous Effects of Invention

The rubber composition for a tire according to the present invention contains a predetermined amount of a modified natural rubber having a phosphorus content of not more than 200 ppm, and a predetermined amount of butadiene rubber, and therefore has improved in fuel economy, abrasion resistance, and deterioration resistance in a good balance.

DESCRIPTION OF EMBODIMENTS

The rubber composition for a tire according to the present invention contains a modified natural rubber having a phosphorus content of not more than 200 ppm and butadiene rubber.

The fuel economy can be improved with the use of a modified natural rubber in which phospholipids contained in natural rubber are decreased or removed. When the modified natural rubber is synthesized, for example, by saponification of natural rubber, however, deterioration-preventing components in natural rubber are also removed in the synthesis. For this reason, the rubber deteriorates fast, resulting in a reduction in properties such as deterioration resistance and abrasion resistance. In contrast, since the rubber component in the present invention contains butadiene rubber in combination with a modified natural rubber, both the fuel economy and the abrasion resistance can be improved, and thus they are achieved well at the same time. Moreover, good deterioration resistance can also be maintained. Accordingly, the fuel economy, abrasion resistance, and deterioration resistance are satisfied in a good balance.

The modified natural rubber has a phosphorus content of not more than 200 ppm. At the phosphorus content more than 200 ppm, tan δ tends to increase to lead to poor fuel economy, and the Mooney viscosity of the unvulcanized rubber composition tends to increase to lead to poor processability. The phosphorus content is preferably not more than 150 ppm, and more preferably not more than 100 ppm. Here, the phosphorus content can be measured according to a known method such as ICP optical emission spectrometry. The phosphorus is derived from phospholipids (phosphorus compounds).

The modified natural rubber preferably has a nitrogen content of not more than 0.3% by mass, and more preferably not more than 0.15% by mass. At the nitrogen content more than 0.3% by mass, the Mooney viscosity tends to increase during storage to lead to poor processability, and the fuel economy tends to be reduced. The nitrogen content can be measured according to a known method such as the Kjeldahl method. The nitrogen is derived from proteins.

The gel content in the modified natural rubber is preferably not more than 20% by mass, more preferably not more than 10% by mass, and still more preferably not more than 7% by mass. At the gel content more than 20% by mass, the processability tends to be reduced, and the fuel economy tends to be reduced. The gel content means a value obtained by measuring the content of insolubles in toluene which is a nonpolar solvent, and may be referred to simply as the "gel content" or "gel fraction" below. The gel content can be measured according to the method below. First, a natural rubber sample is immersed in dehydrated toluene, and shielded from light and left in a dark place as it is for one week. Then, the toluene solution is centrifuged at $1.3 \times 10^5$ rpm for 30 minutes to separate an insoluble gel fraction from a toluene-soluble fraction. Methanol is added to the insoluble gel fraction to solidify the gel fraction. The solidified gel fraction is then dried. The gel content is determined from the ratio of the mass of the dried gel fraction to the original mass of the sample.

Preferably, phospholipids do not substantially exist in the modified natural rubber. The expression "not substantially exist" means that no peak ascribed to phospholipids exists between −3 ppm and 1 ppm in $^{31}$P-NMR measurement of an extract prepared by chloroform extraction from a natural rubber sample. The phosphorus peak existing between −3 ppm and 1 ppm is a peak ascribed to a phosphoric acid ester structure of the "phospho" of phospholipids.

The modified natural rubber may be obtained by a method described in JP 2010-138359 A, for example. In particular, the modified natural rubber is preferably prepared by a production method including a step (A) of saponifying natural rubber latex to prepare a saponified natural rubber latex; a step (B) of coagulating the saponified natural rubber latex and performing an alkali treatment on the resulting coagulated rubber; and a step (C) of washing the resulting rubber until the phosphorus content in rubber falls to not more than 200 ppm. This production method can reduce the phosphorus content efficiently. Moreover, when coagulation is carried out with acid, the remaining acid is neutralized by the alkali treatment. Thus, not only deterioration of rubber by acid can be prevented, but also the nitrogen content and other contents in rubber can be further reduced. By using the modified natural rubber obtained by this production method, the fuel economy, abrasion resistance, and deterioration resistance can be remarkably improved, and thus these performances are achieved at a high level.

In the production method, saponification may be performed by adding an alkali and optionally a surfactant to natural rubber latex, and leaving the latex at rest at a predetermined temperature for a certain period. If necessary, stirring or the like may be performed. The production method can reduce the phosphorus and nitrogen contents in natural rubber.

Known natural rubber latexes such as raw latex, purified latex, and high ammonia latex may be used as the natural rubber latex. Examples of the alkali used for the saponification include sodium hydroxide, potassium hydroxide, calcium hydroxide, and amine compounds. Particularly preferred are sodium hydroxide and potassium hydroxide. As the surfactant, known anionic surfactants, nonionic surfactants, and amphoteric surfactants may be used. Among these, preferred are anionic surfactants, and more preferred are sulfonate anionic surfactants.

In the saponification, the amount of alkali added may be appropriately set. Preferably, the amount is 0.1 to 10 parts by mass per 100 parts by mass of the solids in natural rubber latex. The amount of the surfactant to be added is preferably 0.01 to 6.0 parts by mass per 100 parts by mass of the solids in natural rubber latex. The temperature and time in the saponification may be appropriately set, and are usually approximately at 20 to 70° C. for 1 to 72 hours.

After the saponification reaction is completed, the saponified natural rubber latex obtained by the reaction is coagulated, and the resulting coagulated rubber may be crushed if necessary. Next, the resulting coagulated rubber or crushed rubber is brought into contact with an alkali to perform an alkali treatment. The alkali treatment can reduce the nitrogen content and other contents in rubber efficiently, and therefore the effects of the present invention are further enhanced. Examples of the coagulation method include a method of adding an acid such as formic acid. The alkali treatment method is not particularly limited as long as the rubber is brought into contact with alkali. Examples thereof include a method of immersing the coagulated rubber or crushed rubber in an alkali. Examples of the alkali usable for the alkali treatment include alkalis as used in the saponification, as well as alkali metal carbonates such as potassium carbonate, sodium carbonate, sodium hydrogen carbonate, potassium hydrogen carbonate, lithium carbonate, and lithium hydrogen carbonate; and aqueous ammonia. Among these, preferred are alkali metal carbonates, and more preferred are sodium carbonate and potassium carbonate, because the effects of the present invention become larger.

In the case where the alkali treatment is performed by the immersion, the rubber (crushed rubber) may be immersed in an alkali aqueous solution preferably having a concentration of 0.1 to 5% by mass, and more preferably 0.2 to 3% by mass, to treat the rubber. This can further reduce the nitrogen content and other contents in rubber.

In the case where the alkali treatment is performed by the immersion, the temperature in the alkali treatment can be appropriately set. Usually, the temperature is preferably 20 to 70° C. Although the time of the alkali treatment depends on the treatment temperature, the time is preferably 1 to 20 hours, and more preferably 2 to 12 hours, in consideration of sufficient treatment and productivity.

After the alkali treatment, the phosphorus content can be reduced by washing. Examples of the washing include a method of diluting the rubber fraction with water for washing, followed by centrifugation, or alternatively followed by leaving the dilution at rest to allow the rubber to float and then discharging only the aqueous phase to recover the rubber fraction. In the case of centrifugation, first the rubber fraction in the natural rubber latex is diluted with water to 5 to 40% by mass, preferably 10 to 30% by mass. Next, the dilution may be centrifuged at 5000 to 10000 rpm for 1 to 60 minutes, and washing may be repeated until the phosphorus content falls to a desired range. In the case of leaving the dilution at rest to allow the rubber to float, addition of water and stirring may be repeated to wash the rubber until the phosphorus content falls to a desired range. After washing is completed, the resulting product is dried to obtain a modified natural rubber usable in the present invention.

The content of the modified natural rubber is not less than 60% by mass, preferably not less than 65% by mass, and more preferably not less than 68% by mass, based on 100% by mass of the rubber component contained in the rubber composition according to the present invention. At the content less than 60% by mass, the rubber strength tends to be reduced, resulting in poor abrasion resistance. The content is not more than 95% by mass, and preferably not more than 92% by mass, based on 100% by mass of the rubber component. At the content more than 95% by mass, the content of BR becomes smaller, and the fuel economy and abrasion resistance tend to be reduced.

The butadiene rubber (BR) is not particularly limited. For example, BR with high cis content and BR containing syndiotactic polybutadiene crystals may be used. Moreover, BR obtained by polymerization with a catalyst containing a lanthanide rare earth element-containing compound, as described in JP 2003-514078 T and the like, may be used. In particular, from the viewpoint of balanced improvement in fuel economy, abrasion resistance, and deterioration resistance, preferred are modified BR (BR modified with a modifier), and more preferred are those modified with a compound represented by formula (I):

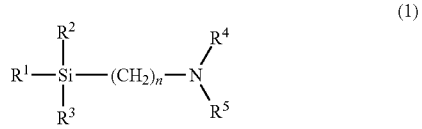

(1)

wherein $R^1$, $R^2$, and $R^3$ are the same as or different from each other, and each represent an alkyl group, an alkoxy group, a silyloxy group, an acetal group, a carboxyl group (—COOH), a mercapto group (—SH), or a derivative thereof; $R^4$ and $R^5$ are the same as or different from each other, and each represent a hydrogen atom, an alkyl group, or a cyclic ether group; and n represents an integer.

Examples of the modified BR which has been modified with a compound represented by the formula (I) include those described in JP 2010-111753 A and JP 2011-122062 A.

In the formula (I), from the viewpoint of achievement of excellent fuel economy, abrasion resistance, and deterioration resistance, $R^1$, $R^2$, and $R^3$ each are suitably an alkoxy group (preferably an alkoxy group having 1 to 8 carbon atoms, and more preferably 1 to 4 carbon atoms). $R^4$ and $R^5$ each are suitably an alkyl group (preferably an alkyl group having 1 to 3 carbon atoms, and more preferably 1 or 2 carbon atoms). Also, n is preferably an integer of 1 to 5, more preferably 2 to 4, and still more preferably 3. Use of such a preferred compound contributes to a good balance of fuel economy, abrasion resistance, and deterioration resistance.

Specific examples of the compound represented by the formula (I) include 2-dimethylaminoethyltrimethoxysilane, 3-dimethylaminopropyltrimethoxysilane, 2-dimethylaminoethyltriethoxysilane, 3-dimethylaminopropyltriethoxysilane, 2-diethylaminoethyltrimethoxysilane, 3-diethylaminopropyltrimethoxysilane, 2-diethylaminoethyltriethoxysilane, and 3-diethylaminopropyltriethoxysilane. Among these, preferred are 3-dimethylaminopropyltrimethoxysilane, 3-dimethylaminopropyltriethoxysilane, and 3-diethylaminopropyltrimethoxysilane because the above performances can then be improved well. These compounds may be used alone, or two or more thereof may be used in combination.

As the method of modifying butadiene rubber with the compound represented by the formula (I), methods as described in JP H06-53768 B and JP H06-57767 B, and known methods may be mentioned. For example, butadiene rubber may be brought into contact with the compound for modification. More specifically, a modification method may be mentioned in which after butadiene rubber is prepared by anionic polymerization, a predetermined amount of the compound is added to the rubber solution, and the polymerizing end (active end) of the butadiene rubber is allowed to react with the compound.

The vinyl content in the BR modified with the compound represented by the formula (I) is preferably not more than 35% by mass, and more preferably not more than 20% by mass. At the vinyl content more than 35% by mass, the fuel economy may be reduced. The lower limit of the vinyl content is not particularly limited, and is preferably not less than 1% by mass, and more preferably not less than 10% by mass.

The vinyl content (the amount of 1,2-butadiene units) can be measured by infrared absorption spectrometry.

The content of BR is not less than 5% by mass, and preferably not less than 8% by mass, based on 100% by mass of the rubber component. At the content less than 5% by mass, sufficient fuel economy and abrasion resistance may not be obtained, and the deterioration resistance may be reduced. The content is not more than 40% by mass, preferably not more than 35% by mass, and more preferably not more than 32% by mass, based on 100% by mass of the rubber component. At the content more than 40% by mass, the content of the modified natural rubber becomes smaller, and sufficient rubber strength may not be obtained.

The total content of the modified natural rubber and BR is preferably not less than 70% by mass, more preferably not less than 80% by mass, still more preferably not less than 90% by mass, and particularly preferably 100% by mass, based on 100% by mass of the rubber component. At the total content in the range, excellent fuel economy, abrasion resistance, and deterioration resistance are obtained.

Examples of usable rubbers other than the modified natural rubber and BR in the rubber component include diene rubbers such as natural rubber (NR), isoprene rubber (IR), styrene butadiene rubber (SBR), styrene isoprene butadiene rubber (SIBR), ethylene propylene diene rubber (EPDM), chloroprene rubber (CR), and acrylonitrile butadiene rubber (NBR).

In the present invention, use of carbon black is preferred. This provides reinforcement. The effects of the present invention are better achieved with the use of carbon black in combination with the modified natural rubber and BR. Examples of the carbon black include GPF, FEF, HAF, ISAF, and SAF, although the carbon black is not particularly limited.

The nitrogen adsorption specific surface area ($N_2SA$) of carbon black is preferably not less than 20 m$^2$/g, more preferably not less than 35 m$^2$/g, still more preferably not less than 70 m$^2$/g, and particularly preferably not less than 100 m$^2$/g. At $N_2SA$ less than 20 m$^2$/g, sufficient reinforcement may not be obtained. The $N_2SA$ is preferably not more than 200 m$^2$/g, and more preferably not more than 150 m$^2$/g. At $N_2SA$ more than 200 m$^2$/g, the carbon black tends to be difficult to disperse, leading to poor fuel economy.

The $N_2SA$ of carbon black can be determined according to JIS K 6217-2: 2001.

The content of carbon black is preferably not less than 5 parts by mass, more preferably not less than 20 parts by mass, and still more preferably not less than 30 parts by mass, per 100 parts by mass of the rubber component. At the content less than 5 parts by mass, sufficient reinforcement may not be obtained. The content is preferably not more than 100 parts by mass, more preferably not more than 80 parts by mass, and still more preferably not more than 60 parts by mass, per 100 parts by mass of the rubber component. At the content more than 100 parts by mass, the fuel economy and processability tend to be reduced.

In the present invention, silica may be used. This provides excellent fuel economy and abrasion resistance. The silica is not particularly limited. For example, dry silica (anhydrous silica) and wet silica (hydrous silica) may be used. Preferred is wet silica (hydrous silica) because wet silica contains a large amount of silanol groups.

The nitrogen adsorption specific surface area ($N_2SA$) of silica is preferably not less than 90 m$^2$/g. At $N_2SA$ less than 90 m$^2$/g, sufficient reinforcement tends not to be obtained. The $N_2SA$ is preferably not more than 250 m$^2$/g. At $N_2SA$ more than 250 m$^2$/g, the dispersibility of silica tends to be reduced, leading to poor processability.

The nitrogen adsorption specific surface area of silica is a value measured by the BET method according to ASTM D3037-81.

The content of silica is preferably 5 to 100 parts by mass per 100 parts by mass of the rubber component. At the content in the range, excellent fuel economy and abrasion resistance are obtained.

In the case where silica is used in the present invention, a silane coupling agent is preferably used. Examples of the silane coupling agent include sulfide-type, mercapto-type, vinyl-type, amino-type, glycidoxy-type, nitro-type, and chloro-type silane coupling agents. Among these, preferred are sulfide-type silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide, and particularly preferred is bis(3-triethoxysilylpropyl)disulfide.

The content of the silane coupling agent is preferably 2 to 15 parts by mass per 100 parts by mass of silica. At the content in the range, excellent fuel economy and abrasion resistance are obtained.

Although oil may be used in the present invention, the content of oil is preferably not more than 5 parts by mass, and more preferably not more than 1 part by mass, per 100 parts by mass of the rubber component. Particularly preferably, substantially no oil is contained. By reducing the oil content, excellent abrasion resistance is obtained.

Other than the ingredients mentioned above, compounding ingredients commonly used in production of rubber compositions such as wax, a variety of antioxidants, stearic acid, zinc oxide, sulfur, and vulcanization accelerators, may be appropriately compounded in the rubber composition according to the present invention.

The rubber composition according to the present invention can be prepared by a commonly used method. Specifically, the rubber composition can be prepared by, for example, a method in which components mentioned above are kneaded by a Banbury mixer, a kneader, an open roll mill, or the like, and then vulcanized. Meanwhile, in the case where a rubber composition containing natural rubber is prepared, natural rubber is usually subjected to a mastication step before a step of kneading components including the rubber component and filler. However, since the present invention uses a modified natural rubber, the kneading step can be performed well without performing the mastication step, to prepare the desired rubber composition.

The rubber composition according to the present invention can be used for various tire components. Among these, the rubber composition can be suitably used for treads (particularly, cap treads).

The pneumatic tire according to the present invention can be formed from the rubber composition by an ordinary method.

Specifically, the unvulcanized rubber composition with additives compounded as needed is extruded and processed into the shape of a tire component such as a tread, and then molded with other tire components in a tire building machine by an ordinary method to form an unvulcanized tire. The unvulcanized tire is then heated and pressurized in a vulcanizer to produce a tire.

The pneumatic tire according to the present invention can be suitably used for heavy load vehicles such as trucks and buses.

EXAMPLES

The present invention will be more specifically described based on Examples, but the present invention is not limited to only these.

Hereinafter, a list of chemicals used in Production Examples will be shown below. The chemicals were purified according to the general methods if necessary.

Natural rubber latex: field latex available from Muhibbah Lateks Sdn. Bhd.

Surfactant: Emal-E27C (sodium polyoxyethylene lauryl ether sulfate) made by Kao Corporation NaOH: NaOH made by Wako Pure Chemical Industries, Ltd.

Preparation of Saponified Natural Rubber

Production Example 1

The solid content concentration (DRC) of natural rubber latex was adjusted to 30% (w/v). Subsequently, 25 g of a 10% Emal-E27C aqueous solution and 50 g of a 40% NaOH aqueous solution were added to 1000 g of the natural rubber latex (wet), and a saponification reaction was then performed at room temperature for 48 hours to obtain a saponified natural rubber latex. The latex was diluted with water until the DRC was adjusted to 15% (w/v). Then, while the latex was slowly stirred, formic acid was added to adjust the pH to 4.0, so that the latex was coagulated.

The coagulated rubber was crushed, and immersed in a 1% sodium carbonate aqueous solution at room temperature for 5 hours. The rubber was then taken out of the solution, and repeatedly washed with 1000 ml of water. Then, the obtained rubber was dried at 90° C. for 4 hours to give a solid rubber (Saponified natural rubber A).

Production Example 2

A solid rubber (Saponified natural rubber B) was obtained in the same manner as in Production Example 1 except that 25 g of the 40% NaOH aqueous solution was added.

In the solid rubbers (Saponified natural rubbers A and B) obtained in Production Examples 1 and 2, and TSR, the nitrogen content, the phosphorus content, and the gel content were measured according to the methods shown below. The results are shown in Table 1.

(Measurement of Nitrogen Content)

The nitrogen content was measured using a CHN CORDER MT-5 (made by Yanaco Analytical Instruments Corp.). In the measurement, first a calibration curve for determining the nitrogen content was prepared using antipyrine as a reference substance. Next, approximately 10 mg of a sample was weighed out, and measured. An average value of three measurements was determined as the nitrogen content of the sample.

(Measurement of Phosphorus Content)

Using an ICP optical emission spectrometer (ICPS-8100, made by SHIMADZU Corporation), the phosphorus content of a sample was determined.

Also, a $^{31}$P-NMR measurement of phosphorus was performed using an NMR analyzer (400 MHz, AV 400 M, manufactured by Bruker Japan Co., Ltd.) as follows: while the measured peak of a P atom in an 80% phosphoric acid aqueous solution was defined as a reference point (0 ppm), an extract prepared by chloroform extraction from the raw rubber was purified, dissolved in $CDCl_3$, and measured.

(Measurement of Gel Content)

An amount of 70.00 mg of a raw rubber sample cut into a size of 1 mm×1 mm was weighed out. To the sample, 35 mL of toluene was added, and the mixture was left at rest in a dark, cool place for one week. Next, the mixture was centrifuged to precipitate a toluene-insoluble gel fraction, and a toluene-soluble supernatant was then removed. Only the gel fraction was solidified with methanol and dried, and the mass thereof was measured. The gel content (%) was determined by the following equation:

Gel content (% by mass)=[mass after drying (mg)/original mass of sample (mg)]×100.

TABLE 1

|  | Saponified natural rubber A (Production Example 1) | Saponified natural rubber B (Production Example 2) | TSR |
|---|---|---|---|
| Nitrogen content (% by mass) | 0.12 | 0.25 | 0.33 |
| Phosphorus content (ppm) | 84 | 123 | 572 |
| Gel content (% by mass) | 5.5 | 14.2 | 26.9 |

As shown in Table 1, the nitrogen, phosphorus, and gel contents in Saponified natural rubbers A and B were lower than those in TSR.

In the $^{31}$P-NMR measurement, Saponified natural rubbers A and B had no peak ascribed to phospholipids between −3 ppm and 1 ppm.

Hereinafter, a list of chemicals used in Examples and Comparative Examples will be shown below.

NR: TSR20
Saponified natural rubber A: Production Example 1
Saponified natural rubber B: Production Example 2
Non-modified BR: UBEPOL BR150B made by Ube Industries, Ltd. ($ML_{1+4}$ (100° C.): 40, cis content: 97% by mass)
Modified BR: modified butadiene rubber made by Sumitomo Chemical Co., Ltd. (S-modified BR (terminally modified); vinyl content: 15% by mass; modified with the compound of formula (I) ($R^1$, $R^2$, $R^3$=—$OCH_3$; $R^4$, $R^5$=—$CH_2CH_3$; n=3))
Carbon black: SHOBLACK N220 made by Cabot Japan K.K. ($N_2SA$: 111 $m^2/g$)
Wax: SUNNOC wax made by Ouchi Shinko Chemical Industrial Co., Ltd.
Antioxidant: Antioxidant 6C (SANTOFLEX 6PPD) produced by FLEXSYS
Stearic acid: stearic acid "Tsubaki" made by NOF CORPORATION
Zinc oxide: zinc oxide #2 made by Mitsui Mining & Smelting Co., Ltd.
Sulfur: powder sulfur made by TSURUMI CHEMICAL INDUSTRY CO. LTD.
Vulcanization accelerator: NOCCELER NS made by Ouchi Shinko Chemical Industrial Co., Ltd.

Examples and Comparative Examples

According to the composition shown in Table 2, the materials other than the sulfur and vulcanization accelerator were kneaded using a 1.7 L Banbury mixer to give a kneaded mixture. Next, the sulfur and vulcanization accelerator were added to the obtained kneaded mixture, and kneaded using an open roll mill. Thus, an unvulcanized rubber composition was obtained.

The unvulcanized rubber composition was vulcanized at 150° C. for 30 minutes to give a vulcanized rubber composition.

The thus obtained vulcanized rubber compositions were evaluated as follows. The results are shown in Table 2.

(Heat Build-Up Properties)

Using a viscoelasticity spectrometer VES (made by Iwamoto Seisakusho), the loss tangent (tan δ) of each composition (vulcanized rubber composition) was measured at a temperature of 70° C., an initial strain of 10%, a dynamic strain of 2%, and a frequency of 10 Hz. The loss tangent was expressed as an index (index of heat build-up properties) by the following equation. As the index value decreases, the heat build-up becomes smaller and therefore the fuel economy becomes higher.

(Index of heat build-up properties)=(tan δ of each composition)/(tan δ of Comparative Example 1)×100

(Abrasion Resistance)

Using a Lambourn abrasion tester made by Iwamoto Seisakusho, the Lambourn abrasion amount of each vulcanized rubber composition was measured at a surface rotational speed of 50 m/min, a load of 3.0 kg, a grit-dropping rate of 15 g/min, and a slip ratio of 20%. Then, the volume loss was calculated from the measured Lambourn abrasion amount. The volume loss of each composition was expressed as an index by the following equation, with the volume loss of Comparative Example 1 being taken as 100. As the index value increases, the abrasion resistance becomes higher.

(Index of abrasion resistance)=(volume loss of Comparative Example 1)/(volume loss of each composition)×100

(Deterioration Resistance)

The vulcanized rubber compositions were subjected to heat deterioration in an oven at 80° C. for 7 days to give deteriorated products. Next, a tensile test according to JIS K6251 was performed to measure the elongation at break of the deteriorated products. The elongation at break of each composition was expressed as an index by the following equation, with the elongation at break of Comparative Example 1 being taken as 100. As the index value increases, the deterioration resistance becomes higher.

(Index of deterioration resistance)=(elongation at break of each composition)/(elongation at break of Comparative Example 1)×100

TABLE 2

| | | Comparative Example 1 | Comparative Example 2 | Example 1 | Example 2 | Example 3 | Example 4 | Comparative Example 3 | Example 5 | Comparative Example 4 |
|---|---|---|---|---|---|---|---|---|---|---|
| Composition (part(s) by mass) | NR | 100 | — | — | — | — | — | — | — | 70 |
| | Saponified natural rubber A (Production Example 1) | — | 100 | 95 | — | 90 | 70 | 50 | 70 | — |
| | Saponified natural rubber B (Production Example 2) | — | — | — | 95 | — | — | — | — | — |
| | Non-modified BR | — | — | 5 | 5 | 10 | 30 | 50 | — | 30 |
| | Modified BR | — | — | — | — | — | — | — | 30 | — |
| | Carbon black | 45 | 45 | 45 | 45 | 45 | 45 | 45 | 45 | 45 |
| | Wax | 1.5 | 1.5 | 1.5 | 1.5 | 1.5 | 1.5 | 1.5 | 1.5 | 1.5 |
| | Antioxidant | 2 | 2 | 2 | 2 | 2 | 2 | 2 | 2 | 2 |
| | Stearic acid | 2 | 2 | 2 | 2 | 2 | 2 | 2 | 2 | 2 |
| | Zinc oxide | 3 | 3 | 3 | 3 | 3 | 3 | 3 | 3 | 3 |
| | Sulfur | 1 | 1 | 1 | 1 | 1 | 1 | 1 | 1 | 1 |
| | Vulcanization accelerator | 1.5 | 1.5 | 1.5 | 1.5 | 1.5 | 1.5 | 1.5 | 1.5 | 1.5 |
| Evaluation | Index of heat build-up properties | 100 | 92 | 90 | 91 | 92 | 94 | 105 | 89 | 98 |
| | Index of abrasion resistance | 100 | 93 | 103 | 101 | 103 | 104 | 98 | 112 | 102 |
| | Index of deterioration resistance | 100 | 90 | 100 | 99 | 100 | 101 | 100 | 98 | 101 |

Apparently from Table 2, in Examples using a modified natural rubber and BR in combination, high levels of fuel economy and of abrasion resistance were achieved in a good balance while good deterioration resistance was maintained. Particularly, excellent performances were achieved in Example 5 using a modified BR. In Comparative Example 3 in which the contents of a modified natural rubber and of BR were out of the respective predetermined ranges, the fuel economy was inferior, and thus the fuel economy, abrasion resistance, and deterioration resistance could not be improved in a good balance.

The invention claimed is:

1. A method for producing a heavy load tire, said method comprising:

a step (A) of saponifying natural rubber latex to prepare a saponified natural rubber latex;

a step (B) of coagulating the saponified natural rubber latex and performing an alkali treatment on the resulting coagulated rubber with at least one selected from the group consisting of potassium carbonate, sodium carbonate, sodium hydrogen carbonate, potassium hydrogen carbonate, lithium carbonate, lithium hydrogen carbonate, and aqueous ammonia;

a step (C) of washing the resulting rubber to produce a modified natural rubber until the phosphorus content in rubber falls to not more than 200 ppm; and a step (D) of forming a heavy load tire from the modified natural rubber.

* * * * *